(12) United States Patent
Sekula

(10) Patent No.: US 6,268,010 B1
(45) Date of Patent: Jul. 31, 2001

(54) REDUCED CALORIE FAT MIMETICS WITH AN AVERAGE NUMBER OF OXYALKYLENE GROUPS PER MOLECULE OF NO MORE THAN FIVE

(75) Inventor: Bernard Charles Sekula, Lebanon Township, NJ (US)

(73) Assignee: Bestfoods, Englewood Cliffs, NJ (US)

( * ) Notice: Subject to any disclaimer, the term of this patent is extended or adjusted under 35 U.S.C. 154(b) by 0 days.

(21) Appl. No.: 09/333,546

(22) Filed: Jun. 15, 1999

(51) Int. Cl.⁷ ............................................... A23D 9/007
(52) U.S. Cl. ..................... 426/611; 426/601; 426/804; 554/169; 554/227
(58) Field of Search .................................... 426/601, 611, 426/804; 554/169, 227, 172, 173

(56) References Cited

U.S. PATENT DOCUMENTS

| | | | |
|---|---|---|---|
| 3,490,918 | 1/1970 | Egan et al. | 99/118 |
| 4,208,444 | 6/1980 | Gilmore et al. | 426/570 |
| 4,582,715 | 4/1986 | Volpenhein | 426/601 |
| 4,797,300 | 1/1989 | Jandacek et al. | 426/549 |
| 4,840,815 | 6/1989 | Meyer et al. | 426/611 |
| 4,861,613 | 8/1989 | White et al. | 426/611 |
| 4,923,707 | 5/1990 | Schoenberg | 426/602 |
| 4,927,658 | 5/1990 | Klemann et al. | 426/611 |
| 4,983,329 | 1/1991 | Cooper | 260/410.7 |
| 4,983,413 | 1/1991 | Meyer et al. | 426/589 |
| 5,006,351 | 4/1991 | Klemann et al. | 426/611 |
| 5,008,126 | 4/1991 | Klemann et al. | 426/611 |
| 5,059,443 | 10/1991 | Ennis et al. | 426/531 |
| 5,063,075 | 11/1991 | Yarger et al. | 426/601 |
| 5,064,678 | 11/1991 | Klemann et al. | 426/611 |
| 5,093,142 | 3/1992 | Klemann et al. | 426/531 |
| 5,118,448 | 6/1992 | Cooper | 554/168 |
| 5,135,683 * | 8/1992 | Cooper | 554/151 |
| 5,139,807 | 8/1992 | Klemann et al. | 426/531 |
| 5,190,782 | 3/1993 | Yarger et al. | 426/531 |
| 5,190,783 | 3/1993 | Klemann et al. | 426/531 |
| 5,213,802 * | 5/1993 | Masten | 424/439 |
| 5,230,913 | 7/1993 | Klemann | 426/97 |
| 5,266,346 | 11/1993 | Klemann et al. | 426/611 |
| 5,288,884 * | 2/1994 | Cooper | 554/168 |
| 5,298,637 * | 3/1994 | Cooper | 554/169 |
| 5,304,665 | 4/1994 | Cooper et al. | 554/149 |
| 5,308,634 | 5/1994 | Cooper | 426/531 |
| 5,362,894 * | 11/1994 | Handwerker | 554/169 |
| 5,371,253 * | 12/1994 | Cooper | 554/173 |
| 5,374,446 * | 12/1994 | Ferenz | 426/611 |
| 5,376,398 | 12/1994 | Cooper et al. | 426/611 |
| 5,387,429 | 2/1995 | Cooper | 426/611 |
| 5,389,392 | 2/1995 | Cooper | 426/531 |
| 5,399,371 | 3/1995 | Harris | 426/611 |
| 5,399,728 * | 3/1995 | Cooper | 554/149 |
| 5,399,729 * | 3/1995 | Cooper | 554/149 |
| 5,427,815 | 6/1995 | Ferenz | 426/611 |
| 5,431,949 | 7/1995 | Meyer et al. | 426/611 |
| 5,466,843 * | 11/1995 | Cooper | 554/149 |
| 5,494,693 * | 2/1996 | Cooper | 426/611 |
| 5,512,313 | 4/1996 | Cooper et al. | 426/611 |
| 5,516,544 | 5/1996 | Sekula et al. | 426/611 |
| 5,589,217 * | 12/1996 | Mazurek | 426/611 |
| 5,597,605 * | 1/1997 | Mazurek | 426/611 |
| 5,635,236 * | 6/1997 | Cooper | 426/611 |
| 5,645,881 | 7/1997 | Tancibok et al. | 426/531 |
| 5,736,174 * | 4/1998 | Cooper | 426/608 |
| 5,858,439 | 1/1999 | Sekula | 426/531 |
| 5,872,269 * | 2/1999 | Sawyer | 554/169 |
| 5,935,631 * | 8/1999 | Golden | 426/611 |
| 5,986,117 * | 11/1999 | Cooper | 554/168 |
| 6,039,998 * | 3/2000 | Sekula | 426/611 |

FOREIGN PATENT DOCUMENTS

| | | |
|---|---|---|
| 236 288 | 9/1987 | (EP) . |
| 415 635 | 3/1991 | (EP) . |
| 571 218 | 11/1993 | (EP) . |
| 571 219 A2 | 11/1993 | (EP) . |
| 95/00034 | 1/1995 | (WO) . |
| WO 97/21354 * | 6/1997 | (WO) . |
| WO 97/21358 * | 6/1997 | (WO) . |
| WO 97/22261 * | 6/1997 | (WO) . |
| 97/22260 | 6/1997 | (WO) . |

* cited by examiner

*Primary Examiner*—Carolyn Paden
(74) *Attorney, Agent, or Firm*—Norris, McLaughlin & Marcus

(57) ABSTRACT

Reduced calorie fat mimetics comprising fatty acid-esterified alkoxylated polyol compositions having an average number of oxyalkylene groups per molecule of no more than 5 and from 5 percent to 39 percent primary hydroxyl groups based on the total amount of hydroxyl groups on the molecule. These reduced calorie fat mimetics are prepared by alkoxylating a polyol such that the average number of oxyalkylene groups per molecule is no more than 5, and subsequently esterifying with fatty acids. The reduced calorie fat mimetics can be synthesized to mimic the properties of the natural fats which are replaced in numerous food products. The fat mimetics are partially digestible thus obviating undesirable gastrointestinal side effects.

18 Claims, No Drawings

REDUCED CALORIE FAT MIMETICS WITH AN AVERAGE NUMBER OF OXYALKYLENE GROUPS PER MOLECULE OF NO MORE THAN FIVE

BACKGROUND OF THE INVENTION

1. Field of the Invention

The present invention relates to reduced calorie fat mimetics based on low molecular weight alkoxylated glycerol esters. More specifically, the invention relates to fat mimetics comprising glycerol which is alkoxylated such that the average number of oxyalkylene groups per molecule is no more than 5 and the number of primary hydroxyl groups converted to secondary or tertiary hydroxyl groups is between 61 percent and 95 percent based on the total number of hydroxyls on the molecule, such that the amount of primary hydroxyl groups on the molecule is between 5 percent and 39 percent of the total number of hydroxyl groups.

2. Description of the Related Art

One of the most prevalent concerns among people today is the amount of fat consumed in their daily diet. It is estimated that fat constitutes about 40% of the total calories in a western diet. Fats are consumed, for example, in meats, chocolates, sweet breads, oils and fried snacks. Conventional fats used for preparing comestible goods generally contribute around 9 calories per gram to the total caloric content of the comestible good. Thus, there is an enormous potential for a fat substitute or mimetic, which exhibits the desired characteristics of fats, but does not contribute as much as the approximately 9 calories per gram contributed by fat.

Despite the considerable research performed in the field of synthetic fat substitutes, an understanding of the precise relationship between the chemical structure of fat mimetics and digestibility remains lacking and the field remains a highly uncertain and unpredictable art. The technical literature related to fat substitutes (i.e., fat mimetics) includes conflicting observations and findings which cannot be easily reconciled or explained. Thus, in the art of fat substitutes, there is no single model or theory that may be applicable to address the digestibility and organoleptically pleasing properties for fat substitutes.

A number of fat substitutes are known which are not subject to hydrolysis and thus pass through the human digestive tract without being absorbed. One example of such a fat substitute is polyol fatty acid polyester (PPE), as shown in U.S. Pat. Nos. 3,251,827; 3,600,186 and 3,963,699. PPE is produced by the reaction of a monosaccharide, disaccharide or sugar alcohol having a minimum of four hydroxyl groups with fatty acids having from 8–22 carbon atoms. A number of methods are known for producing PPE, which basically include transesterification of the fatty acid methyl esters to the polyol. The PPE process requires long reaction time with alternating additions of fresh transesterification catalyst and excess soybean fatty acid methyl ester. In U.S. Pat. No. 3,251,827 a process for the preparation of PPE is disclosed which uses Q solvent-free interesterification using phenyl esters. U.S. Pat. No. 3,963,699 involves solvent-free transesterification to produce PPE.

Another example is U.S. Pat. No. 4,861,613 to White et al. (referred to herein as "White" and incorporated by reference herein in its entirety). According to White, polyol such as glycerin must be reacted (epoxylated) with a quantity of $C_3$–$C_6$ epoxide sufficient to convert greater than 95 percent of primary hydroxyl groups of the polyol to the secondary or tertiary hydroxyl groups prior to esterification with fatty acids to obtain a non-digestible fat substitute. White teaches of use of esterified epoxide-extended polyol (EEEP), having present large amounts of secondary and tertiary linkages as a non-digestible fat substitute. White requires less than 5 percent primary hydroxyl groups for resistance to hydrolysis by pancreatic lipase.

PPE and EEEP compounds possess the physical and organoleptic properties of conventional triglyceride lipids yet are significantly lower in available calories due to their pronounced resistance towards pancreatic lipase catalyzed hydrolysis. Unfortunately, as a consequence of their hydrolytic stability, low digestibility and lipophilic character, PPE and EEEP compounds which are liquid at body temperature may possess undesirable gastronomical side effects when consumed at high levels in the diet. These undesirable gastronomical side effects may include anal leakage, that is leakage of the fat substitute through the anal sphincter; and separation of the fat substitute from excreted stool.

U.S. Pat. No. 5,512,313 issued to Cooper describes esterified propoxylated polyols containing at least 40 percent primary ester linkages and normalized hydrolysis rates of less than 20 percent based on an olive oil standard. The compounds are prepared by use of a catalyst to carry out ring-opening of a 1,2-alkylene oxide in a manner such that at least 40 percent of the hydroxyl groups of the alkoxylated polyol are primary. Cationic ring-opening polymerization catalyst is necessary to obtain at least 40 percent primary hydroxyl groups and the reaction must be carefully controlled to avoid undesired by- products such as cyclic oligomers.

U.S. Pat. No. 4,849,242 to Kershner teaches of preparation of reduced calorie food compositions containing oil-like polymer fatty acid esters having the property of being substantially hydrolyzed during the digestion process into a mixture of fatty acids and a non-caloric water-soluble or water-dispersible polymeric alcohol. U.S. Pat. Nos. 5,059,443 and 5,077,073 to Ennis describe the use of esterified alkoxylated alkyl glycosides, and esterified alkoxylated sugars and sugar alcohols as low calorie fat substitutes. These patents do not address, among other things, the use of esterified propoxylated glycerin compounds as fat substitutes, the distinction between primary and secondary or tertiary ester linkages on the digestibility of the fat substitute or the effect of partial digestibility on the undesirable gastrointestinal side effects that may occur with some fat substitutes.

U.S. Pat. No. 5,597,605 issued to Mazurek concerns low calorie fat components of food that consist of esterified propoxylated glycerin compounds and a partially digestible liquefying agent with particular solid fat index (SFI) profiles. These low calorie fat components are reported to lack undesirable gastrointestinal side effects as a result of high solids content of the EPG while maintaining satisfactory organoleptic properties partially due to the liquefying agent. U.S. Pat. No. 5,376,398 to Cooper involves the use of fatty-acid esterified polytetramethylene ether glycols with edible triglycerides.

Applications of the assignee of the invention involving the replacement of conventional fat in comestible products with fatty acid-esterified propoxylated glycerin compositions are currently pending. These applications involve the use of fatty-acid esterified propoxylated glycerin compositions in milk products, Reduced Calorie Reconstituted Milk and Milk Products, Ser. No. 08/572,277 filed on Dec. 13, 1995; fried snack foods, Reduced Calorie Fried Snacks, Ser.

No. 08/575,711 and Reduced Calorie Fried Snacks Having a Cooling Sensation When Placed in the Mouth, Ser. No. 08/575,373 both filed on Dec. 20, 1995 and spoonable dressings, Freezable Low-Calorie Spoonable Dressings and Method for Their Production, Ser. No. 09/262,221, filed on Mar. 4, 1999.

It has now been found that by limiting the degree of propoxylation of polyols and the number of primary hydroxyls that are converted to secondary or tertiary hydroxyls, the undesirable gastronomical side effect of anal leakage can be overcome. A new class of reduced calorie fat mimetics has now been discovered in which glycerol is partially alkoxylated, such that the average number of oxyalkylene groups per molecule is no more 5, and more particularly between about 2 and 5, and subsequently esterified with fatty acids. This level of alkoxylation limits the number of primary hydroxyl groups that are converted to secondary or tertiary hydroxyl groups to between about 61 percent and 95 percent. When the total number of primary hydroxyl groups on the molecule are between 5 percent and 39 percent, the undesirable gastrointestinal side effects are alleviated. Since primary hydroxyl esters are significantly more sensitive to lipase activity than secondary/tertiary hydroxyl esters, these compounds are hydrolyzed to a greater degree in vivo than, for example, the EEEP compounds of White. The fat mimetic compositions of the present invention are partially digested in vivo and hydrolysis increases the hydrophilicity of the compounds. As a result, oil intolerance and anal leakage are reduced and/or obviated by the partial digestibility of the fat mimetic which makes the compound more polar and less oil like. This feature of the invention, that is the propoxylation number being no more than 5 and the number of primary hydroxyl groups converted to secondary or tertiary being between 61 percent and 95 percent such that the amount of primary hydroxyl groups is between 5 percent and 39 percent, allows for the creation of emulsions in the lower bowel during digestion which aids in the reduction and/or prevention of anal leakage.

In the present specification and claims, all parts and percentages are by weight unless otherwise specified.

SUMMARY OF THE INVENTION

The present invention relates to fat substitutes comprising esterified alkoxylated polyols, particularly esterifiedpropoxylatedglycerol, which is susceptible to hydrolysis during digestion thus being partially digestible. This is accomplished by only partially propoxylating the polyol backbone such that the average number of oxypropylene (oxyalkylene) groups per molecule is no more than 5, and preferably between about 2 and 5, and subsequently esterifying with fatty acids. At this level of propoxylation, the number of primary hydroxyl groups that are converted to secondary and tertiary hydroxyls, can be limited to about between 61 percent to 95 percent of the total number of hydroxyl groups on the molecule, such that the amount of primary hydroxyl groups on the molecule is between 5 percent and 39 percent of the total number of hydroxyl groups. The compositions of the invention have a porcine pancreatic lipase hydrolysis index of less than about 15 based on an olive oil standard of 100.

Esterified alkoxylated polyols are prepared, preferably esterified propoxylated glycerin compositions, wherein the propoxylation of the polyol is carefully controlled to ensure that the average number of oxypropylene groups per molecule is no more than 5. Thereafter, the propoxylated polyol is esterified with fatty acids. By carefully controlling the propoxylation of the polyol, including esterified propoxylated glycerin compositions, the number of primary hydroxyl groups that are converted to secondary and tertiary hydroxyls can be limited to from 61 percent to about 95 percent. Primary hydroxyl esters are significantly more sensitive to lipase activity than secondary and/or tertiary esters, and, thus, are more susceptible to in vivo hydrolysis. Increasing the degree of hydrolysis of the esterified alkoxylated polyol increases tiff hydrophilicity of the compound. Accordingly, by only partially alkoxylating the polyol backbone, the conversion of primary hydroxyl esters to secondary hydroxyl esters and/or tertiary hydroxyl esters is limited which results in more susceptibility to in vivo hydrolysis and reduces and/or obviates undesirable gastrointestinal side effects, such as oil intolerance and anal leakage.

The fat replacement compositions of the invention can be comprised of one, or a mixture of two or more, fatty acid-esterified alkoxylated polyol compositions, including esterified alkoxylated glycerin compositions and esterified propoxylated glycerin compositions, that can be used to replace all or a portion of the natural or artificial fats in various food products.

The fatty acid-esterified alkoxylated polyol compositions are made by incorporating alkylene oxide groups into a typical triglyceride fat as described in White. The average number of alkylene oxide groups which are incorporated into a compound is called the alkoxylation number. The melting point, melting profile and other characteristics of the composition can be modified by adjusting the alkoxylation number, the fatty acid chain length and level of unsaturation. Similarly, two or more different fatty acid-esterified alkoxylated polyol compositions (i.e., having different alkoxylation numbers) of the same fatty acid, two or more fatty acid-esterified alkoxylated polyol compositions of different fatty acids having the same or different alkoxylation numbers, and any combination thereof which provides the desired fat replacement characteristics may be utilized.

The most suitable fatty acid-esterified alkoxylated polyol composition or combination of fatty acid-esterified alkoxylated polyol compositions will vary depending upon the type of fat being replaced in a particular food product. The selection of the most suitable fatty acid-esterified alkoxylated polyol compositions or combination of fatty acid-esterified alkoxylated polyol compositions according to the invention is based on the particular food application as will be apparent to those skilled in the art.

DETAILED DESCRIPTION OF THE PREFERRED EMBODIMENT

The fat replacement compositions of the invention preferably are comprised of fatty acid-esterified propoxylated glycerin compositions (sometimes referred to herein as "EPG" in the singular form and as "EPGs" in the plural form). EPGs are made by incorporating propylene oxide, (sometimes referred to herein as "oxypropylene" or "PO") groups, for purposes of the invention no more than 5 PO groups, including between about 2 and 5 PO groups, into a typical triglyceride fat as described in White, such as soybean oil, olive oil, cottonseed oil, corn oil, tallow, lard and mixtures thereof. The average number of PO groups which are incorporated into a compound is called the propoxylation number. The fat replacement compositions can be comprised of one EPG, a mixture of two or more different EPGs (i.e., having different propoxylation numbers) of the same fatty acid, a mixture of two or more EPGs of different fatty acids having the same or different propoxylation numbers, and any combination thereof, as long as the desired melting profile characteristics are obtained, and the number of primary hydroxyl esters that are converted to secondary and/or tertiary hydroxyl esters are limited to from 61 percent to 95 percent with the propoxylation number being no more than 5.

The EPG compositions of this invention can function effectively as reduced calorie fat replacement compositions in a variety of food products and food applications. As a result of the low propoxylation number of the EPGs of the invention, the EPG is partially digestible and reduces or obviates undesirable gastrointestinal side effects such as oil intolerance and anal leakage.

The fatty acid-esterified propoxylated glycerin compositions of this invention contain glyceryl residues, oxypropylene units, and $C_{12}$ to $C_{24}$ fatty acid acyl groups. Typically, the compositions are mixtures of individual fatty acid-esterified propoxylated glycerin compounds which may differ from each other in degree of propoxylation and acyl group composition. The glyceryl residue may have the generic structure

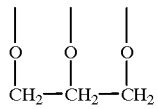

and is derived from glycerin

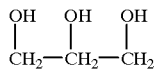

or a glycerin equivalent. The oxypropylene units are generally interspersed between glyceryl residues and the fatty acid acyl groups and have the structure

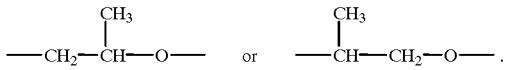

Typically, more than one oxypropylene unit may be present between an oxygen of an individual glyceryl residue and an acyl group such that a polyoxypropylene unit is created. However, a single "branch" or "arm" of the fatty acid-esterified propoxylated glycerin may contain only one oxypropylene unit. Certain of the acyl groups may be attached directly to the glyceryl residue, without any intervening oxypropylene units. No more than 5 oxypropylene units per glyceryl residue, and preferably between about 2 and 5 oxypropylene units per glyceryl residue, must be present in the overall composition and only between 61 percent to about 95 percent of the primary hydroxyls are converted to secondary or tertiary hydroxyls, such that the EPG has from 5 percent to 39 percent primary hydroxyl groups, in order to minimize or eliminate oil intolerance, anal leakage and other undesirable gastrointestinal effects.

The number of oxypropylene units being no more than 5 is critical as this allows for limiting the conversion of primary hydroxyl esters which results in greater susceptibility to in vivo hydrolysis thereby making the EPG of the invention partially digestible thus reducing or obviating undesirable gastrointestinal side effects such as oil intolerance and anal leakage. The presence of oxypropylene units, however, is important, as the oxypropylene units help to lower the melting point of the compositions thereby improving the mouthfeel and melting characteristics as compared to analogous compositions not containing oxypropylene units.

It is desirable for the fatty acid-esterified propoxylated glycerin composition to be substantially esterified such that it has an average of at least about 2.5 (more preferably, at least about 2.9) fatty acid acyl groups per equivalent of glycerin. The extent of esterification may be readily determined by conventional analytical methods such as hydroxyl number.

The structure of the EPG composition preferably is such that the composition has a porcine pancreatic lipase hydrolysis index of less than about 15 based on an olive oil standard of 100, i.e., the amount of hydrolysis of the EPG composition is 15 percent of the amount of olive oil hydrolyzed by the same amount porcine pancreatic lipase under the same conditions. Methods of measuring porcine pancreatic lipase hydrolysis rate are described in White.

Table I illustrates hydrolysis rates of various EPG compositions, i.e. EPG compositions with propoxylation numbers of 2, 3, 4, 5, 8 and 14, and, an olive oil standard. Specifically, Table I provides data regarding hydrolysis rates based on in vitro susceptibility of EPG compositions when present in concentrations that are non-limiting to the reaction to porcine pancreatic lipase. The data includes the normalized hydrolyzability of the EPG compositions. The normalized hydrolyzability compares the hydrolysis rate on an equal molar basis. This is pertinent because EPG compositions have fewer ester bonds per volume equivalent compared to conventional triglycerides. Based on the data in Table I, EPG compositions with propoxylation numbers no more than 5 will undergo partial hydrolysis in vitro based on the olive oil standard and compared to EPG compositions with propoxylation numbers greater than 5.

TABLE I

In Vitro Susceptibility of EPG Compositions to Porcine Pacreatic Lipase Hydrolysis Rate

| Substrate | Molecular Weight | Density | #Moles | #Grams | # Millimoles | Hydrolysis Rate | Hydrolyzability | Normalized Hydrolyzability |
|---|---|---|---|---|---|---|---|---|
| Olive oil | 885.4 | 0.909 | 20 | 18.18 | 61.60 | 2.18–7.62 | 1.000 | 1.000 |
| EPG-14 Soy | 1688.5 | 0.940 | 20 | 18.8 | 33.40 | 0.002 | 0.000 | <0.001 |
| EPG-08 Soy | 1340.0 | 0.937 | 20 | 18.74 | 41.96 | 0.005 | 0.001 | 0.001 |
| EPG-05 Soy | 1165.8 | 0.935 | 20 | 18.70 | 50.65 | 0.018 | 0.002 | 0.002 |
| EPG-04 Soy | 1107.7 | 0.931 | 20 | 18.62 | 53.22 | 0.052 | 0.010 | 0.012 |
| EPG-03 Soy | 1049.6 | 0.929 | 20 | 18.58 | 53.11 | 0.079 | 0.015 | 0.017 |

TABLE I-continued

In Vitro Susceptibility of EPG Compositions to Porcine Pacreatic Lipase
Hydrolysis Rate

| Substrate | Molecular Weight | Density | #Moles | #Grams | # Millimoles | Hydrolysis Rate | Hydrolyzability | Normalized Hydrolyzability |
|---|---|---|---|---|---|---|---|---|
| EPG-02 Soy | 991.5 | 0.920 | 20 | 18.40 | 55.67 | 0.362 | 0.107 | 0.118 |
| EPG-00 Soy | 875.4 | 0.9195 | 20 | 18.39 | 63.02 | 2.342 | 0.477 | 0.466 |

Hydrolysis Rate = # ueq/min for an equivalent amount of enzyme (~200 units)
Hydrolyzability is relative to triolein (olive oil)
Normalized Hydrolyzability = Hydrolyzability compared on an equal milmolar basis; EPG has fewer available ester bonds than triglycerides in an equivalent volume due to its increased molecular weight.
EPG -  Soy - EPG composition derived from soybean oil wherein  designates the propoxylation number of the EPG composition.

Table II illustrates the amount of fatty acids hydrolyzed for various EPG compositions, i.e. EPG compositions with porpoxylation numbers of 2, 3, 4, 5, 8 and 14, and an olive oil standard. Speifically, Table II provides data for the percentage of fatty acids hydrolyzed based on the in vitro susceptibility of EPG compositions when the substrate is present in concentration that are rate limiting to porcine pancreatic lipase. Based on the data in Table II, EPG compositions with lower propxylation numbers, and particularly propoxylation numbers of between about 2 and about 4 will have a greater percentage of fatty acids hydrolyzed in vitro than EPG compositions with higher propoxylation numbers, such as those greater than 5.

acyl groups present are fixed), the solid fat index at a particular temperature will increase as the propoxylation number is decreased and will decrease as the propoxylation number is increased. As the average number of fatty acid acyl group carbons per equivalent of glycerin decreases, or as the iodine number of the composition increases (as a result of increasing the proportion of unsaturated fatty acid acyl groups present), the average number of oxypropylene units per glycerin will need to be decreased to maintain the solid fat index at a given temperature above a predetermined target value. If a particular fatty acid-esterified propoxylated glycerin composition has an undesirably high solid fat index at a given temperature, the index may be brought below a

TABLE II

In Vitro Susceptibility of EPGs to Porcine Pacreatic Lipase
Percent Fatty Acid Hydrolyzed

| | | | Assay | | | Intermediate Time Point | | | | End Point | | | |
|---|---|---|---|---|---|---|---|---|---|---|---|---|---|
| | | | | | | Time | Base Used | | % FA | Time | Base Used | | % FA |
| Substrate | M.W. | Density | Oil(g) | FA(meq) | Enz(LU) | (min) | mls | meq | Hydrolyzed | (min) | mls | meq | Hydrolyzed |
| Olive oil | 885.4 | 0.909 | 0.909 | 3.080 | 20 k | 30 | 7.53 | 0.75 | 24.33 | 60 | 8.35 | 0.83 | 27.00 |
| EPG-14 Soy | 1688.5 | 0.94 | 0.94 | 1.670 | 100 k | 30 | 0.20 | 0.02 | 1.29 | 180 | 0.71 | 0.08 | 4.59 |
| EPG-08 Soy | 1340 | 0.937 | 0.937 | 2.098 | 100 k | 30 | 0.30 | 0.03 | 1.46 | 180 | 1.02 | 0.10 | 4.96 |
| EPG-05 Soy | 1165.8 | 0.935 | 0.935 | 2.406 | 100 k | 30 | 0.25 | 0.02 | 1.03 | 180 | 0.80 | 0.08 | 3.30 |
| EPG-04 Soy | 1107.7 | 0.931 | 0.931 | 2.521 | 100 k | 30 | 0.90 | 0.09 | 3.56 | 180 | 1.69 | 0.17 | 6.69 |
| EPG-03 Soy | 1049.6 | 0.929 | 0.929 | 2.655 | 100 k | 30 | 1.35 | 0.13 | 5.05 | 180 | 2.45 | 0.24 | 9.20 |
| EPG-02 Soy | 991.5 | 0.92 | 0.92 | 2.784 | 100 k | 30 | 3.58 | 0.39 | 13.87 | 180 | 4.63 | 0.50 | 17.96 |

EPG -  Soy - EPG composition derived from soybean oil wherein  designates the propoxylation number of the EPG composition.
FA - Fatty Acid
Enz - Enzyme
LU - lipase units (#)
meq - milliequivalents The average number of oxypropylene units in the EPG compositions of the invention must be no more than 5 but must not be so low as to result in a high proportion of the acyl groups being attached directly to glyceryl residues since such directly attached acyl groups will be nearly as susceptible to enzymatic cleavage as the acyl groups in a conventional fully digestible triglyceride, thus reducing the usefulness of the composition as a low calorie fat substitute. The average number of oxypropylene units in the EPG compositions of the invention should be no more than 5 and may be at least about 2 but no more than 5.

The melting characteristics for a given EPG may be adjusted as needed by varying the average number of oxypropylene units per glycerin (propoxylation number) present in the composition. At a constant fatty acid acyl group content (i.e., if the relative proportions of the different predetermined target value by increasing the propoxylation number. By so adjusting the average number of oxypropylene units per equivalent of glycerin, the melting characteristics of each EPG may be controlled, and one EPG or a mixture of two or more EPG compounds may be employed to obtain a fat replacement composition having characteristics which are the most suitable for the type of fat being replaced in a particular application. In any event, however, for the EPG compositions of the invention, the average number of oxypropylene units, that is the propoxylation number, must be no more than 5, and preferably between about 2 and 5.

When the propoxylation number is limited, the number of primary hydroxyl groups on the molecule is correspondingly limited to between 5 percent and 39 percent. It was unexpectedly discovered that limiting the propoxylation number would limit the conversion of primary hydroxyl groups to secondary and tertiary hydroxyl groups, thus obtaining a fat replacement compositions without undesirable gastrointestinal side effects. This is significant because the novel EPG compositions having between 5 percent and 39 percent primary hydroxyls which do not have gastrointestinal intolerance and anal leakage can be made through processes which do not require any special procedures, steps or other materials thus providing a fat substitute composition without side products or by-products and which do not require further processing or reaction limitations to prevent side products or by-products.

Suitable EPGs may be prepared using either fatty acids or fatty acid derivatives such as fatty acid esters, fatty acid halides, or fatty acid anhydrides. Generally speaking, $C_{12}$–$C_{24}$, both saturated and unsaturated, fatty acids and their derivatives can be used as starting materials for preparing the EPGs of the invention. Specific illustrative fatty acids suitable for use as this component of the fatty acid-esterified propoxylated glycerin compositions include, but are not limited to, lauric acid, myrstoleic acid, myristic acid, palmitoleic acid, oleic acid, linoleic acid, linolenic acid, elaicdic acid, arachidonic acid, erucic acid, stearic acid, palmitic acid, cetoleic acid, gadoleic acid, rincinoleic acid, elaeostearic acid, eicosanoic (arachidic) acid, heneicosanoic acid, docosanic (behenic) acid, tricosanoic acid, and tetracosanoic (lignoceric) acid. Mixtures of these fatty acids may also be utilized to advantage.

While all of the acyl groups in the fatty acid-esterified propoxylated glycerin composition may be derived from $C_{12}$–$C_{24}$ fatty acid, the compositions may contain minor amounts of acyl groups derived from other $C_2$–$C_{10}$ fatty acids. Preferably, the proportion of such other acyl groups is less than about 40 percent. Generally, the incorporation of acyl groups which are relatively short in length ($C_2$–$C_{10}$), unsaturated, and/orbranched will tend to decrease the melting point of the resulting EPG.

The fatty acids which optionally may be used in combination with the required $C_{12}$–$C_{24}$ fatty acids may be any of the known $C_2$ to $C_{10}$ fatty acids such as acetic acid, propionic acid, butyric acid, valeric acid, caproic acid, caprylic acid, pelargonic acid, capric acid, or mixtures of these acids. Preferably, linear monocarboxylic acids containing from 0 to 5 double bonds are employed.

The proportions and chemical structures of the fatty acid acyl groups in the fat replacement compositions of this invention should be selected such that the mouthfeel characteristics are similar to those for the type of fat which is being replaced. Increasing the ratio of average number of fatty acid acyl group carbons per equivalent of glycerin will shift the melting range of an EPG to a higher average temperature while decreasing the ratio will shift the melting range to a lower average temperature.

The average number of fatty acid acyl group carbons per equivalent of glycerin in the fatty acid-esterified propoxylated glycerin compositions of the invention ($N_a$) may be readily calculated from a knowledge of the fatty acid acyl group content (i.e., the chemical structures and relative proportions of the fatty acids used to prepare the compositions). The following formula may be used to calculate this average number ($N_a$) for a fatty acid-esterified propoxylated glycerin composition prepared using fatty acids A and B:

$$N_a = \frac{\text{moles } A \times \text{no. carbons in } A}{\text{moles propoxylated glycerin}} + \frac{\text{moles } B \times \text{no. carbons in } B}{\text{moles propoxylated glycerin}}$$

For example, a composition prepared by reacting a mixture of 1.5 moles of stearic acid (a $C_{18}$ fatty acid) and 1.5 moles of eicosanoic acid (a $C_{20}$ fatty acid) with 1 mole of propoxylated glycerin containing an average of 3 oxypropylene units per glycerin will have an average of 57 fatty acid acyl carbons per equivalent of glycerin.

To minimize the amount of EPG composition absorbed in vivo through the intestinal wall and, thus, the available caloric content of the fatty acid esterified propoxylated glycerin fat replacement compositions of the invention, the chemical composition should be selected such that the average molecular weight is at least about 800. More preferably, the minimum molecular weight is about 1000. In order for the fatty acid-esterified propoxylated glycerin composition to function as a suitable replacement for the natural fat in many food products it is also desirable that the average molecular weight not exceed about 1500. Preferably, the molecular weight is below about 1300.

The preferred EPGs of the invention may be different for different kinds of food applications. EPG compositions of the invention, however must have a propoxylation number no more than 5, and, preferably between about 2 and 5. As a result, these combinations will have between 5 percent and 39 percent of ester linkages as primary, that is between 61 percent and 95 percent of the ester linkages can be present as secondary and tertiary esters or mixtures thereof.

Any type or combination of EPG is useful for the present invention provided that the number of oxypropylene units per unit of glycerin is no more than 5 and the number of primary hydroxyls converted to secondary and/or tertiary hydroxyls is between 61 and 95 percent, such that between 5 percent and 39 percent of the hydroxyls are primary. The fatty acids used for the EPG compositions can be derived from suitable naturally occurring or synthetic fatty acids and can be saturated or unsaturated, including positional and geometric isomers, depending on the desired physical properties of the resulting fat mimetic. Naturally occurring fats and oils can serve as the source for the fatty acid component in the compound. For example, rapeseed oil provides a good source for $C_{22}$ fatty acid. $C_{16}$–$C_{18}$ fatty acids can be provided by tallow, soybean oil or cottonseed oil. Shorter chain fatty acids and oils can be provided by coconut, palm kernel or babassu oils. Corn oil, lard, olive oil, palm oil, peanut oil, safflower seed oil, sesame oil, sunflower seed oil and menhaden fish oil are examples of other natural oils which can serve as the source of the fatty acid component.

An embodiment of the invention employs as a fat replacement composition a mixture of a stearic acid-esterified propoxylated glycerin composition having an average number of oxypropylene units per equivalent of glycerin (propoxylation number) of no more than 5, an iodine valve less than about 10, an average number of fatty acid acyl group carbons per equivalent of glycerin of from about 51 to about 57, and a melting profile similar to the fat being replaced. For this embodiment, fatty acids which are predominantly stearic, having at least about 75 percent and preferably at least about 80 percent by weight of $C_{18}$ fatty acid, are most preferred. For example, hydrogenated soybean fatty acid is predominantly stearic, generally from about 83 percent to about 93 percent by weight. Other fatty acid sources having more than about 75 percent stearic acid after hydrogenation include corn oil, cottonseed oil, olive oil, peanut oil, canola (low erucic rapeseed) oil, safflower oil, sesame oil, sunflower oil and mixtures thereof.

For certain applications, behenic (i.e. $C_{22}$) acid containing fatty acid compositions are employed. Fatty acid compositions which are relatively high in behenic acid content, having at least about 30 percent and preferably at least about 35 percent by weight of $C_{22}$ fatty acid, are suitable. Behenic acid may be derived from rapeseed oil, and such fatty acids derived from rapeseed oil contain a relatively high proportion (typically about 30 to about 50 weight percent) of $C_{22}$ fatty acids. Erucic acid present may be readily converted by hydrogenation to behenic acid, either before or after incorporation into the fatty acid-esterified propoxylated glycerin composition.

A number of vegetable oils are known which contain high proportions (typically about 70 to about 95 weight percent) of $C_{18}$ fatty acids. Unsaturated $C_{18}$ fatty acids present may be hydrogenated before or after incorporation into the fatty acid-esterified propoxylated glycerin composition. Illustrative vegetable oils of this type include, but are not limited to, soybean oil, corn oil, cottonseed oil, olive oil, peanut oil, canola oil, safflower oil, sesame oil, sunflower oil, and the like. Fatty acids derived from mixtures of such oils may also be utilized to advantage.

One specific type of EPG suitable for use in accordance with the present invention is a fatty acid-esterified propoxylated glycerin composition having an average number of oxypropylene units of no more than 5 and an IV less than or equal to about 10, wherein the fatty acids are comprised of about 35 percent to about 45 percent by weight behenic acid and about 35 percent to about 45 percent by weight stearic acid (the balance of the fatty acids being any of the other known fatty acids).

In another desirable embodiment, the fatty acid-esterified propoxylated glycerin composition has an IV less than or equal to about 10 (i.e., 0 to about 10) and is obtainable by esterifying a propoxylated glycerin having an average number of oxypropylene units of no more than 5 with a fatty acid mixture wherein from about 80 percent to about 95 percent by weight of the fatty acid mixture are derived from rapeseed oil and the balance of said fatty acids are derived from a vegetable oil selected from the group consisting of soybean oil, corn oil, cottonseed oil, olive oil, peanut oil, canola oil, safflower oil, sesame oil, sunflower oil, and mixtures thereof.

A particularly suitable EPG of the invention is made by preparing a mixture of about 90 percent by weight hydrogenated rapeseed fatty acid and about 10 percent by weight soya fatty acid and esterifying the mixture with propoxylated glycerol to synthesize a crude EPG. The product is a fatty acid-esterified propoxylated glycerin composition having an average number of oxypropylene units per equivalent of glycerin (propoxylation number) of no more than about 5, an iodine number less than about 10, an average number of fatty acid acyl group carbons per equivalent of glycerin of from about 54 to about 60, and a drop melting point (also called a dropping point as measured by the Mettler Dropping Point method, AOCS Official Method Cc 18–80(93)) of from about 102° F. to about 110° F.

The fatty acid-esterified propoxylated glycerin fat replacement compositions of this invention may be prepared using any suitable method. In general, the procedures described in U.S. Pat. Nos. 4,861,613 (the White patent, referenced above) and U.S. Pat. No. 4,983,329 and in European Patent Publication No. 353,928, the disclosures of which are incorporated by reference herein in their entireties for synthesizing other fatty acid-esterified propoxylated glycerin compositions will be appropriate for use provided that the necessary $C_{12}$–$C_{24}$ fatty acids or fatty acid derivatives are employed in the esterification step and further provided that the propoxylation number is kept at no more than 5, and preferably between about 2 and 5, and the number of primary hydroxyls are limited to from about 5 percent to about 39 percent of the total number of hydroxyl esters. As such the number of primary ester linkages converted to secondary and tertiary esters or mixtures thereof is limited to from 61 percent to 95 percent. As is explained in more detail in the above-mentioned publications, either fatty acids or fatty acid equivalents such as fatty acid esters, fatty acid halides, or fatty acid anhydrides may actually be employed in the esterification. When saturated linear fatty acid acyl groups are used, the $C_{12}$–$C_{24}$ saturated linear fatty acid acyl groups may also be introduced by using $C_{12}$–$C_{24}$ unsaturated fatty acids in the esterification step and then hydrogenating the esterified propoxylated glycerin composition to increase the proportion of $C_{12}$–$C_{24}$ saturated linear fatty acid acyl groups to the desired level. Any residual free fatty acid remaining in the composition after esterification should preferably be removed or reduced as much as possible to minimize problems with off-flavor, off-odor, or storage stability.

The fatty acid-esterified propoxylated glycerin compositions of the invention are particularly suitable for use as full or partial replacements for the natural fat or other fat mimetics in a variety of food products. In this manner food compositions can be prepared wherein all or some of the conventional fat in the food product is replaced with the EPG compositions described herein, that is EPG compositions with propoxylation numbers of no more than 5, and preferably between about 2 and 5, wherein the amount of primary hydroxyl groups converted to secondary and/or tertiary hydroxyl groups is limited to between 61 percent and 95 percent of the total number of hydroxyl groups on the molecule in that the number of primary hydroxyls on the EPG molecule is from 5 percent to 39 percent of the total number of hydroxyls. The food compositions may be prepared with EPG compounds made by any of the methods discussed herein. When the EPG of the present invention is used as a partial replacement, the balance of the fat component may be a natural fat or a different fat substitute, equivalent or mimetic. The amount of the fat replacement composition of the invention may, if desired, constitute up to 100 percent; and can constitute from about 50 percent to 100 percent; of the total fat in the food product. Food compositions comprising EPG compounds of the invention will not possess undesirable gastrointestinal side effects associated with food compositions made with other fat substitutes, including oil intolerance, leakage of the fat substitute through the anal sphincter and separation of the fat substitute from excreted stool.

EXAMPLES

Example 1

Propoxylatedglycerols with an average number of oxyalkylene groups per glycerin molecule (propoxylation number) ranging from 1 to 5 were synthesized in accordance with the methods described in White. Each propoxylated glycerol compound was then subjected to proton nuclear magnetic resonance (NMR) spectroscopy to ascertain the content of primary hydroxyl groups in the EPG compounds. By comparison of NMR spectroscopy data for the compositions of the invention with control data, the percentage of primary hydroxyl groups in each of the compositions with propoxylation numbers ranging from 1 to 5 was determined. Table III illustrates the percent of primary hydroxyls present in each of the EPG compositions.

TABLE III

| Compound | Propoxylation Number | % Primary Hydroxyls (Mole Ratio) |
|---|---|---|
| EPG-01 | 1 | 39 |
| EPG-02 | 2 | 23 |
| EPG-03 | 3 | 9 |
| EPG-04 | 4 | 0 |
| EPG-05 | 5 | 0 |

Low molecular weight propoxylated glycerols were esterified with soybean oil fatty acids to form EPG compositions with propoxylation numbers of 2, 3 and 5. These EPG compositions were subjected to in vitro lipase challenge studies to determine the relative rate of hydrolysis compared to an olive oil standard. Various samples of EPG in the form of an emulsion were prepared with the types of EPG that are set forth in Table IV. Enzyme catalyzed hydrolysis was performed in a water jacketed beaker. The pH of the emulsion was continuously monitored and maintained with 0.1N NaOH, using a Radiometer Copenhagen RTS 822 recording titration system equipped with a PHM 84 pH meter and a REA 270 derivitization unit. The beaker was maintained at 37° C. by water circulated from a EXACAL EX-200 water bath available commercially from Neslab. During reaction, the emulsion was continuously stirred and maintained under a nitrogen atmosphere by direct introduction of compressed nitrogen into the gas space above.

Each sample was individually tested for enzymatic hydrolysis with purified lipase, Type VI from Porcine Pancreas obtained from Sigma Chemical Company, St. Louis, Mo. (Catalogue Number L-2253). In each case, hydrolysis was conducted by adding 10 ml each of emulsified sample, together with 10 ml of deoxycholate (1.6% sodium deoxycholate; 32 mM NaCl) and 10 ml of deionized water into the reaction beaker. The pH was adjusted and the emulsion was stirred for at least 5 minutes to achieve thermal equilibrium at 37° C. An aliquot of the enzyme solution (10–300 µl) was then added. The rate of addition of NaOH solution which was required to maintain the desired pH was continuously monitored using the RTS 822 device.

Table IV illustrates the relative rates of hydrolysis as determined through the process described immediately above for the EPG compositions with propoxylation numbers 2, 3 and 5, aind for olive oil and demonstrates that EPG compounds having propoxylation numbers not greater than 5 will undergo partial hydrolysis compared to olive oil. The figures in parenthesis for the samples designated as EPG-02 and EPG-03 are provided so that the relative rates of hydrolysis can be compared on an equal molar basis. The numbers in parenthesis are calculated by dividing the hydrolysis rate by the number of millimoles of the compound tested to obtain a molar hydrolysis rate and the multiplying the molar hydrolysis rate by the number of millimoles of olive oil contained in the same volume.

TABLE IV

| Oil Emulsion | Propoxylation Number | Relative Rate of Hydrolysis |
|---|---|---|
| Olive Oil (standard) | N/A | 100 |
| EPG-02 | 2 | 13.8 (15.7) |

TABLE IV-continued

| Oil Emulsion | Propoxylation Number | Relative Rate of Hydrolysis |
|---|---|---|
| EPG-03 | 3 | 2.0 (2.4) |
| EPG-05 | 5 | 0.1 |

Four versions of liquid EPG compositions derived from soybean oil with propoxylation numbers of 14, 8, 5 and 2 were prepared and tested in young food-restricted rats. The EPG compositions used in this study are set forth in Table V.

TABLE V

| Sample No. | EPG Version | Physical State | Propoxylation Number |
|---|---|---|---|
| 1 | 14-soyate | liquid | 14 |
| 2 | 08-soyate | liquid | 8 |
| 3 | 05-soyate | liquid | 5 |
| 4 | 02-soyate | liquid | 2 |

The four versions of EPG compounds set forth in Table V were tested in separate groups of rats by introducing the EPG compositions into each group's daily diet at three different levels. EPG compounds were introduced into the rat's normal 7.0 grams daily food supply at either about 5% (about 0.35 grams) daily, about 9% (about 0.63 grams) daily or about 12% (about 0.84 grams) daily. The body weight of each rat in each group was measured periodically during the 30-day test period.

The groups of rats were observed for perianal leakage, and observations were recorded as 1) none of the rats exhibiting perianal leakage (N), 2) some of the rats exhibiting perianal leakage (S) and 3) all of the rats in each group exhibiting perianal leakage (A). The data, illustrated in Table VI, demonstrates that rats fed with a diet that includes liquid EPG-02 soyate, (Sample 4 in Table V), propoxylation number 2, did not experience perianal leakage and rats fed with a diet that includes liquid EPG-05 Soyate (Sample 3 in Table V) propoxylation number 5, experienced perianal leakage only when the diet was comprised of 9 percent and 12 percent EPG. By contrast, rats fed with a diet that included liquid EPG compositions with propoxylation numbers of 14 and 8 (Samples 1 and 2 in Table V) experienced perianal leakage when the EPG compositions were fed at 6 percent of the daily diet.

TABLB VI

| | Percentage EPG in Diet | | |
|---|---|---|---|
| Sample No.[1] | 6% | 9% | 12% |
| 1 | S | A | A |
| 2 | S | A | A |
| 3 | N | A | A |
| 4 | N | N | N |

[1]These sample numbers relate to the sample numbers set forth in Tables V.
N - None of the rats exhibited perianal leakage
S - Some of the rats in the group exhibited perianal leakage
A - All of the rats in the group exhibited perianal leakage

What is claimed is:

1. A fat mimetic composition comprised of at least one fatty acid-esterified alkoxylated polyol composition having an average number of oxyalkylene groups per molecule of about 2 and from 5 percent to 39 percent primary hydroxyl groups based on the total amount of hydroxyl groups on said molecule said fat mimetic composition being susceptible to partial hydrolysis.

2. The composition of claim 1, wherein said composition has a porcine pancreatic lipase hydrolysis index of less than about 15 based on an olive oil standard of 100.

3. The composition of claim 1, comprising at least one fatty acid-esterified propoxylated glycerin composition.

4. The composition of claim 3, wherein at least about 75 percent by weight of a fatty acid in said fatty acid-esterified propoxylated glycerin composition is stearic acid.

5. The composition of claim 4, having said fatty acid in said fatty acid-esterified propoxylated glycerin composition derived from an oil selected from the group consisting of soybean oil, corn oil, cottonseed oil, olive oil, peanut oil, canola oil, safflower oil, sesame oil, sunflower oil and mixtures thereof.

6. The composition of claim 3, wherein at least about 30 percent by weight of a fatty acid in said fatty acid-esterified propoxylated glycerin composition is behenic acid.

7. The composition of claim 6, having said fatty acid in said fatty acid esterified propoxylated glycerin composition derived from rapeseed oil.

8. The composition of claim 3, having said fatty acid in said fatty acid-esterified propoxylated glycerin composition comprised of about 35 percent to about 45 percent by weight behenic acid and about 35 percent to about 45 percent by weight stearic acid.

9. The composition of claim 3, having said fatty acid-esterified propoxylated glycerin composition derived by esterifying a propoxylated glycerin having an average number of oxypropylene units per equivalent of glycerin of about 2 with a fatty acid mixture and from about 80 percent to about 95 percent by weight of the fatty acids in said mixture derived from rapeseed oil and the balance of said fatty acids derived from a vegetable oil selected from the group consisting of soybean oil, corn oil, cottonseed oil, olive oil, peanut oil, canola oil, safflower oil, sesame oil, sunflower oil and mixtures thereof.

10. The composition of claim 3, wherein said fatty-acids have at least 75 percent by weight of $C_{18}$ fatty acid derived from the group consisting essentially of hydrogenated soybean oil, corn oil, cottonseed oil, olive oil, peanut oil, canola (low erucic rapeseed) oil, safflower oil, sesame oil, sunflower oil and mixtures thereof.

11. The composition of claim 3, having an iodine number less than about 30.

12. The composition of claim 3, having a molecular weight between about 800 and about 1,500.

13. A reduced calorie food composition having a fat component comprising a fatty acid-esterified alkoxylated polyol composition in an amount of from about 50 percent to 100 percent, by weight, of the total fat component of said food composition said fatty acid-esterified alkoxylated polyol composition having an average number of oxyalkylene groups per molecule of about 2 and from 5 percent to 39 percent primary hydroxyl groups based on the total amount of hydroxyl groups on the molecule.

14. The reduced calorie food composition of claim 13, wherein said fatty acid-esterified alkoxylated polyol composition comprises at least one fatty acid-esterified propoxylated glycerin composition.

15. A method of making a reduced calorie food composition having a fat component comprising replacing from about 50 percent to about 100 percent, by weight, of the fat component with a composition comprised of a fatty acid-esterified alkoxylated polyol composition having an average number of oxyalkylene groups per molecule of about 2 and from 5 percent to 39 percent primary hydroxyl groups based on the total number of hydroxyl groups on the molecule.

16. The method of claim 15, wherein said fatty acid-esterified alkoxylated polyol composition comprises at least one fatty acid-esterified propoxylated glycerin composition.

17. The method of making a fatty acid esterified alkoxylated polyol composition comprising the steps of incorporating about 2 propylene oxide groups on a polyol thereby limiting conversion of primary hydroxyl groups to secondary and tertiary hydroxyl groups, or mixtures thereof, to from 61 percent to 95 percent of the total number of hydroxyl groups and subsequently esterifying with fatty acids.

18. The method of claim 17, wherein said polyol composition is a glycerin composition.

* * * * *